United States Patent
Kim et al.

(10) Patent No.: US 9,602,183 B2
(45) Date of Patent: Mar. 21, 2017

(54) METHOD AND APPARATUS FOR REPORTING CHANNEL STATE INFORMATION IN WIRELESS COMMUNICATION SYSTEM

(71) Applicant: LG ELECTRONICS INC., Seoul (KR)

(72) Inventors: Kijun Kim, Anyang-si (KR); Jonghyun Park, Anyang-si (KR); Illsoo Sohn, Anyang-si (KR); Hyungtae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 14/385,095

(22) PCT Filed: Mar. 14, 2013

(86) PCT No.: PCT/KR2013/002044
§ 371 (c)(1),
(2) Date: Sep. 12, 2014

(87) PCT Pub. No.: WO2013/137655
PCT Pub. Date: Sep. 19, 2013

(65) Prior Publication Data
US 2015/0049625 A1    Feb. 19, 2015

Related U.S. Application Data

(60) Provisional application No. 61/610,997, filed on Mar. 14, 2012.

(51) Int. Cl.
*H04W 24/10* (2009.01)
*H04B 7/06* (2006.01)
(Continued)

(52) U.S. Cl.
CPC .......... *H04B 7/0626* (2013.01); *H04B 7/024* (2013.01); *H04B 7/0619* (2013.01);
(Continued)

(58) Field of Classification Search
None
See application file for complete search history.

(56) References Cited

U.S. PATENT DOCUMENTS

2010/0080154 A1* 4/2010 Noh ................ H04B 7/0452
370/310
2010/0271968 A1* 10/2010 Liu ................. H04L 25/0202
370/252
(Continued)

FOREIGN PATENT DOCUMENTS

KR  10-2011-0035807 A   4/2011
KR  10-2012-0001273 A   1/2012
(Continued)

*Primary Examiner* — Hassan Kizou
*Assistant Examiner* — Hashim Bhatti
(74) *Attorney, Agent, or Firm* — Birch, Stewart, Kolasch & Birch, LLP

(57) ABSTRACT

One embodiment of the present invention is a method for reporting channel state information by means of a terminal in a wireless communication system, the method comprising: a step of measuring a channel using at least one channel state information-reference signal (CSI-RS) indicated by at least one feedback type index from among a plurality of feedback type indices; and a step of generating channel state information based on the channel measurement and reporting the channel state information. Each of the plurality of feedback type indices indicates one or more CSI-RS configurations to be used in channel estimation and an effective channel relating to said one or more CSI-RS configurations.

9 Claims, 12 Drawing Sheets

(51) Int. Cl.
*H04L 1/00* (2006.01)
*H04B 7/02* (2006.01)

(52) U.S. Cl.
CPC .......... *H04L 1/0026* (2013.01); *H04L 1/0077* (2013.01); *H04W 24/10* (2013.01); *H04L 2001/0092* (2013.01)

(56) References Cited

U.S. PATENT DOCUMENTS

| | | |
|---|---|---|
| 2010/0273514 A1 | 10/2010 | Koo et al. |
| 2011/0249578 A1* | 10/2011 | Nayeb Nazar ........ H04L 1/0027 370/252 |
| 2011/0299484 A1* | 12/2011 | Nam ..................... H04L 1/0025 370/329 |
| 2011/0319068 A1 | 12/2011 | Kim et al. |
| 2012/0026964 A1* | 2/2012 | Koivisto ............. H04B 7/0452 370/329 |
| 2012/0076017 A1* | 3/2012 | Luo ..................... H04L 1/0027 370/252 |
| 2012/0188904 A1 | 7/2012 | Koo et al. |
| 2013/0107832 A1* | 5/2013 | Kim ..................... H04B 7/024 370/329 |
| 2013/0107849 A1 | 5/2013 | Park |
| 2013/0114428 A1* | 5/2013 | Koivisto ............... H04B 7/024 370/252 |

FOREIGN PATENT DOCUMENTS

| | | |
|---|---|---|
| KR | 10-2012-0002875 A | 1/2012 |
| KR | 10-2012-0007526 A | 1/2012 |

* cited by examiner

FIG. 5
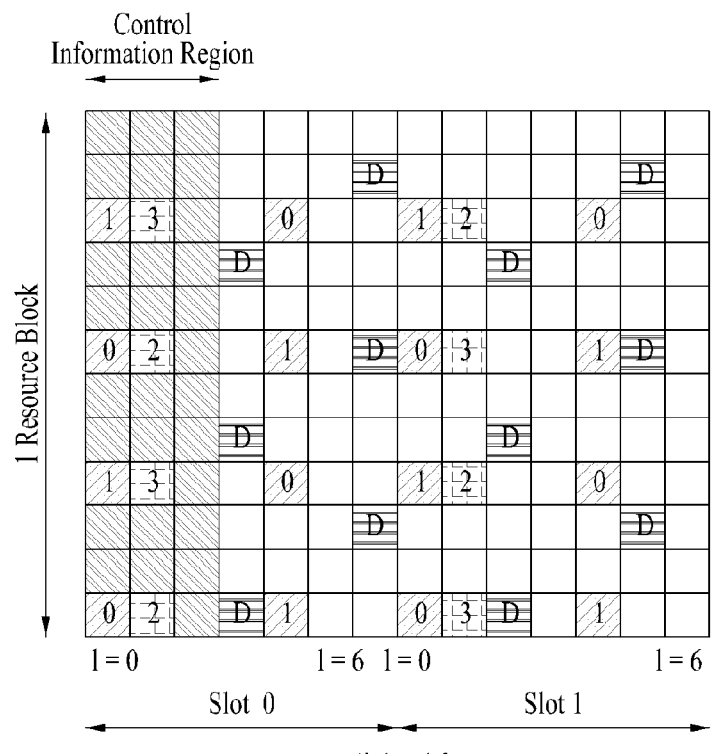
(a)
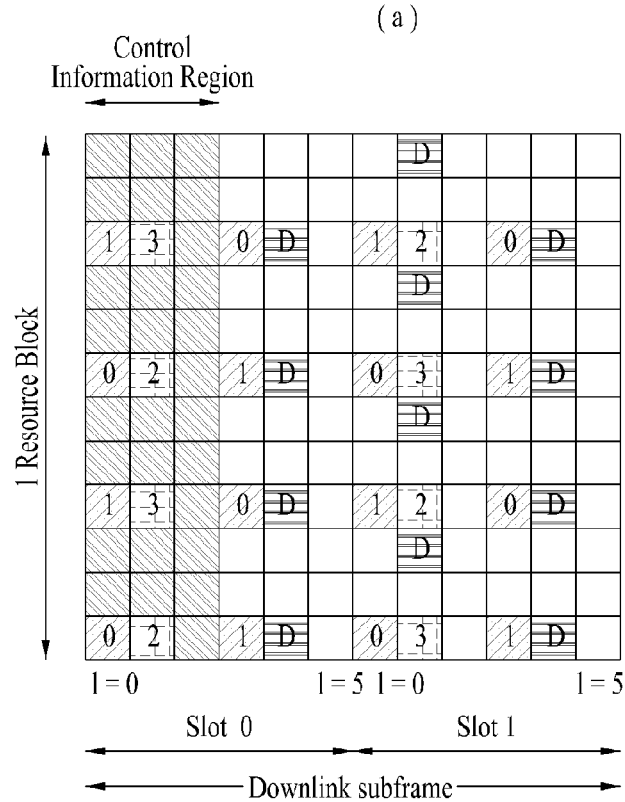
(b)

FIG. 6

FIG. 8
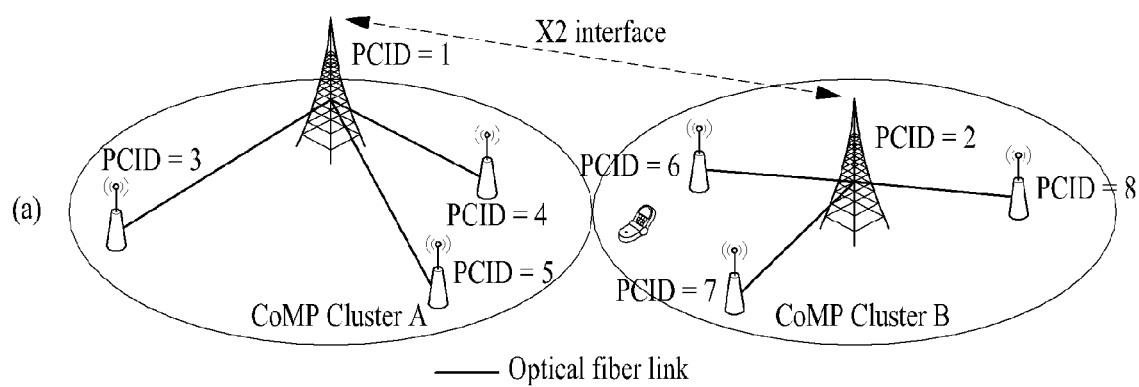
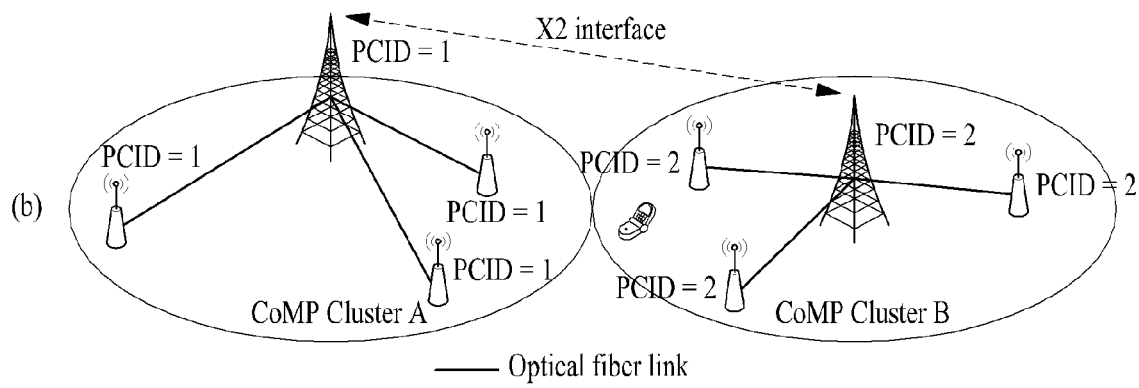

METHOD AND APPARATUS FOR REPORTING CHANNEL STATE INFORMATION IN WIRELESS COMMUNICATION SYSTEM

CROSS REFERENCE TO RELATED APPLICATIONS

This application is the National Phase of PCT/KR2013/002044 filed on Mar. 14, 2013, which claims priority under 35 U.S.C. 119(e) to U.S. Provisional Application No. 61/610,997 filed on Mar. 14, 2012, all of which are hereby expressly incorporated by reference into the present application.

TECHNICAL FIELD

The present invention relates to a wireless communication system and, more particularly, to a method and apparatus for transmitting channel state information for supporting a coordinated multi-point (CoMP) environment.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in a method for measuring a channel and reporting channel state information using a channel state information reference signal in a CoMP environment.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution for reporting channel state information by a user equipment (UE) in a wireless communication system, including measuring a channel using at least one channel state information-reference signal (CSI-RS) indicated by at least feedback type index of a plurality of feedback type indexes, and generating channel state information based on the channel measurement and reporting the same, wherein each of the feedback type indexes indicates at least one CSI-RS configuration to be used for channel estimation and a valid channel related to the at least one CSI-RS configuration.

According to a second aspect of the present invention, provided herein is a user equipment in a wireless communication system, including a receive module, and a processor, wherein the processor measures a channel using at least one channel state information-reference signal (CSI-RS) indicated by at least feedback type index of a plurality of feedback type indexes, and generates channel state information based on the channel measurement and reporting the same, wherein each of the feedback type indexes indicates at least one CSI-RS configuration to be used for channel estimation and a valid channel related to the at least one CSI-RS configuration.

The first and second aspects of the present invention may include the following details.

The at least one feedback type index may be indicated by a channel state information request field.

When the channel state information request field indicates two or more feedback type indexes, the UE may report a best one of results of the channel measurement based on the two or more feedback type indexes.

The channel state information request field may indicate a feedback type index for a serving cell when set to '01', indicate a feedback type index for a single cell when set to '10', and indicate a feedback type index for two or more cells when set to '11'.

The plurality of feedback type indexes may include a feedback type index related to transmission from a single cell and a feedback type index related to joint transmission from two or more cells.

Reporting of the channel state information may be periodically performed when one CSI-RS is used for the channel measurement, and may be aperiodically performed when two or more CSI-RSs are used for the channel measurement.

The periodic reporting may be performed though transmission on a physical uplink control channel, and the aperiodic reporting may be performed through transmission on a physical uplink shared channel.

The at least one feedback type index may be indicated through higher layer signaling.

The at least one feedback type index may be indicated in control information on a physical downlink control channel.

The plurality of feedback type indexes may be delivered to the UE as a binary number A position of '1' in the binary number may represent an index of a CSI-RS configuration indicated by a corresponding feedback type index.

The valid channel may be expressed by the following equation:

$$[H_{n1}^T H_{n2}^T \ldots H_{nm}^T]^T.$$

In the equation, may denote a channel matrix, m may denote the number of CSI-RS configurations indicated by a feedback type index, n1 to nm may denote CSI-RS configuration indexes, and T may denote transpose.

Advantageous Effects

According to embodiments of the present invention, channel state reporting proper for a CoMP environment may be performed, and efficient CoMP management may be implemented.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a reference signal;

FIG. 6 is a diagram illustrating a channel state information reference signal;

FIG. 8 is a diagram illustrating a coordinated multi-point cluster to which an embodiment of the present invention is applicable;

BEST MODEL

Figure 1:
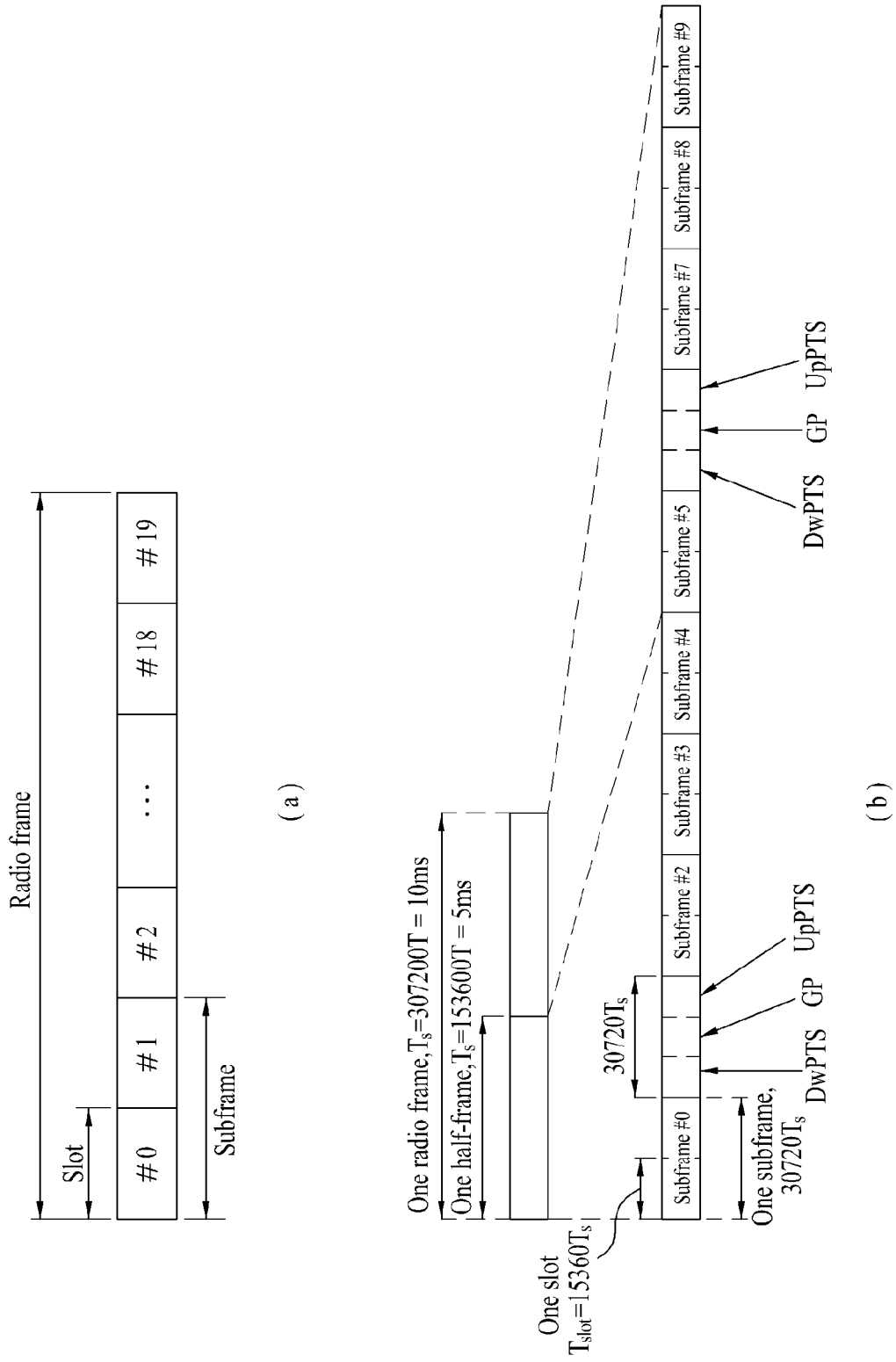
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)". The name "cell" adopted in the following descriptions may be applied to transmission/reception points such as a base station (or eNB), a sector, a remote radio head (RRH), and a relay, and may be used a general term to identify a component carrier at a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LET-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms.

A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
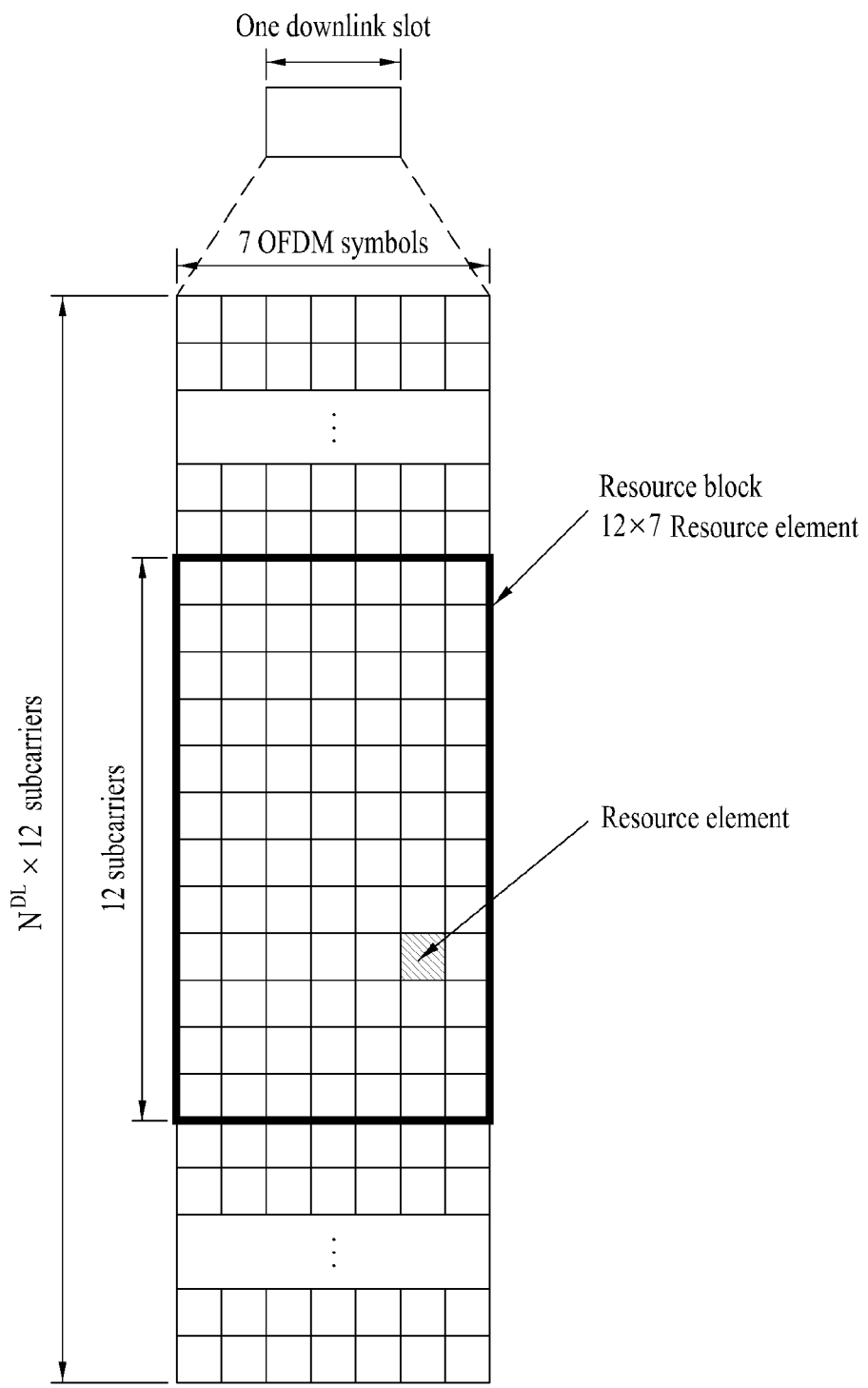
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
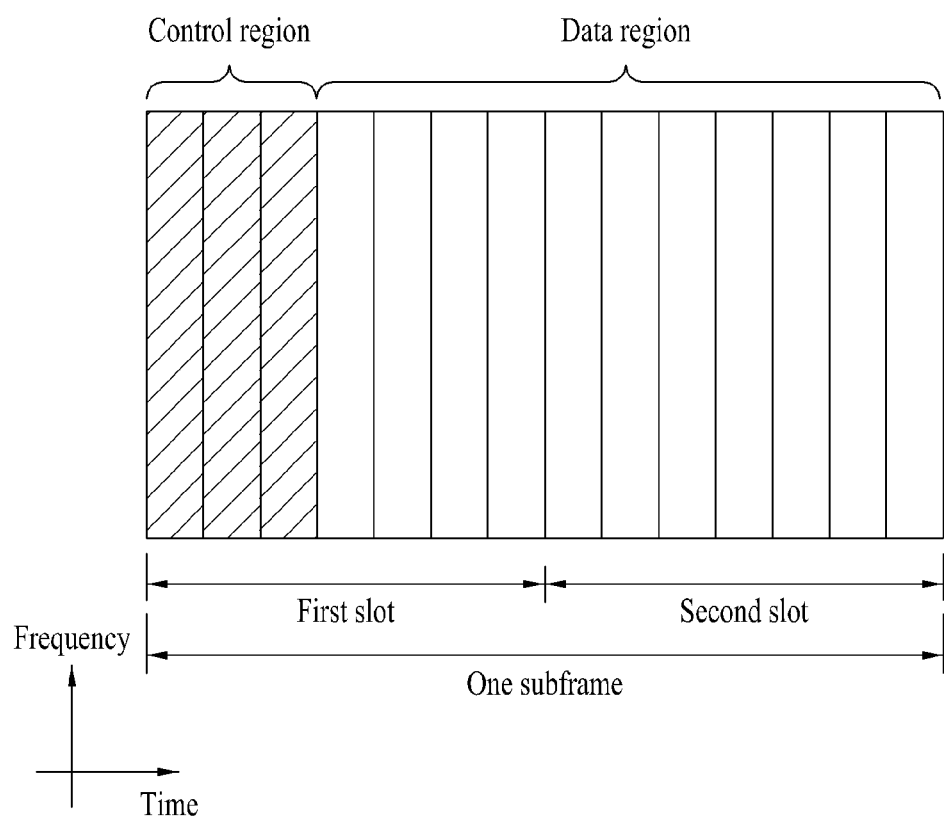
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
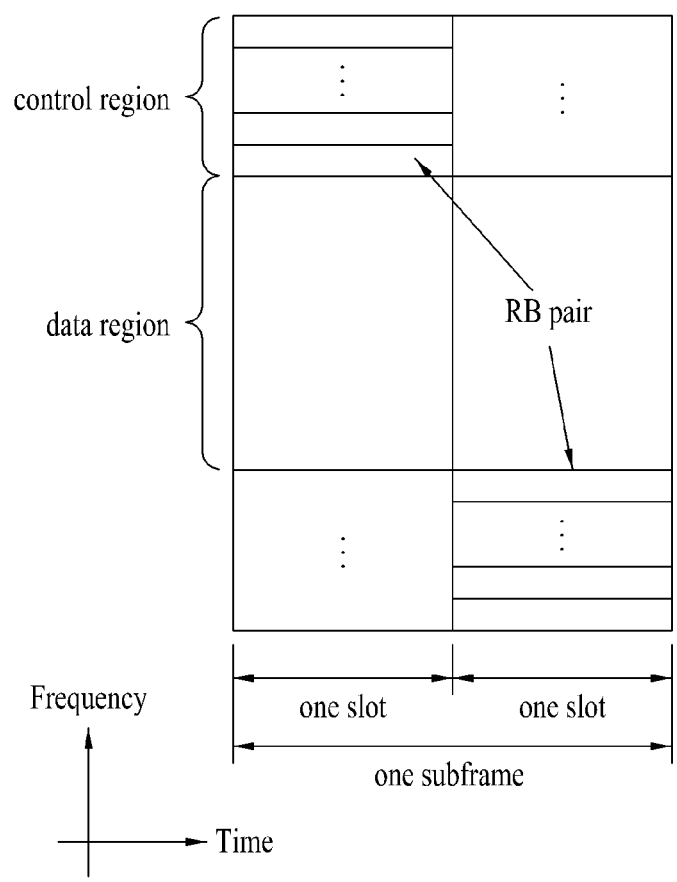
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MB-SFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Channel State Information-RS (CSI-RS)

The CSI-RS, which is designed for the LTE-A system supporting up to eight antenna ports on downlink, is a reference signal intended for channel measurement. The CSI-RS is different from the CRS which is intended for channel measurement and data demodulation. Accordingly, the CSI-RS does not need to be transmitted in every subframe, unlike the CRS. The CSI-RS is used in transmission mode 9, and the DMRS is transmitted for data demodulation.

More specifically, the CSI-RS may be transmitted through antenna ports 1, 2, 4, and 8. When one antenna port is used, it may be antenna port #15. When two antenna ports are used, they may be antenna ports #15 and #16. When four antenna ports are used, they may be antenna ports #15 to #18. When eight antenna ports are used, they may be antenna ports #15 to #22.

A CSI-RS may be generated using Equation 1 given below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Equation 1}$$

$$m = 0, 1, \ldots, N_{RB}^{max,DL} - 1$$

Herein, $r_{l,n_s}(m)$ denotes a generated CSI-RS, c(i) denotes a pseudo random sequence, $n_s$ denotes the slot number, l denotes an OFDM symbol, and $N_{RB}^{max,DL}$ denotes the maximum number of RBs of a DL bandwidth.

The CSI-RS generated through Equation 1 may be mapped to an RE for each antenna port, using Equation 2.

$$\text{Equation 2}$$

$$a_{k,l}^{(p)} = w_{l''} \cdot r_{l,n_s}(m')$$

$$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & CSI \text{ reference signal configurations 0-19, normal cyclic prefix} \\ 2l'' & CSI \text{ reference signal configurations 20-31, normal cyclic prefix} \\ l'' & CSI \text{ reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, k' and l' may be determined according to CSI-RS configurations as shown in Table 1.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 6:
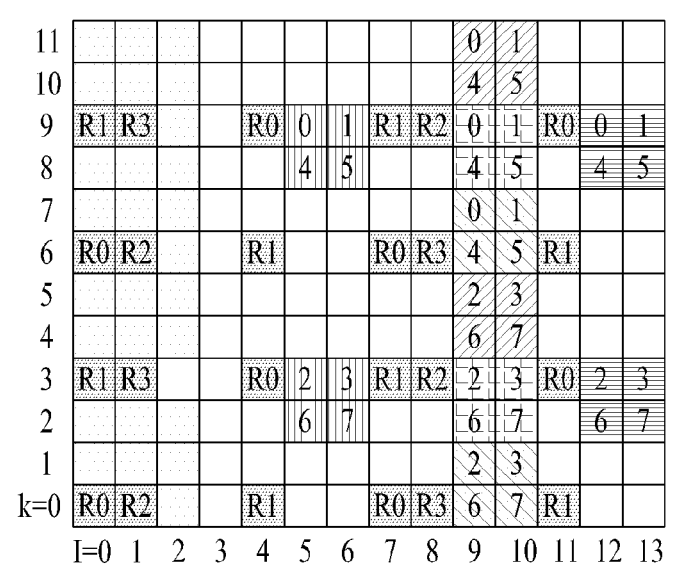

For a specific CSI-RS according to Equation 2 and Table 1, mapping to REs is performed for each antenna port. FIG. 6 shows mapping of CSI-RSs for each antenna port as described above. In FIG. 6, R0 to R3 respectively represent mapping of CRSs to antenna ports, and the number indications represent mapping of CSI-RSs to antenna ports. For example, REs indicated by numbers 0 and 1 represent mapping of a CSI-RS corresponding to antenna port 0 or 1. In this case, CSI-RSs corresponding to two antenna ports are mapped to the same RE, and may be distinguished by different orthogonal codes.

Next, as described above, the CSI-RS may be transmitted in a specific subframe rather than in every subframe. Specifically, the CSI-RS may refer to CSI-RS subframe configurations as listed in Table 2 given below, and be transmitted in a subframe satisfying Equation 3.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

$$(10n_f + \lfloor n_s/2 \rfloor - \Delta_{CSI-RS}) \bmod T_{CSI-RS} = 0 \quad \text{Equation 3}$$

In Table 2, $T_{CSI-RS}$ denotes the period for transmission of a CSI-RS, $\Delta_{CSI-RS}$ is an offset value, $n_f$ denotes a system frame number, and $n_s$ denotes a slot number.

The CSI-RS may be signaled to a UE as a CSI-RS configuration information element, as shown in Table 3.

TABLE 3

```
CSI-RS-Config-r10 ::=      SEQUENCE {
    csi-RS-r10                              CHOICE {
        release                                 NULL,
        setup                                   SEQUENCE {
            antennaPortsCount-r10                   ENUMERATED {an1, an2, an4, an8},
            resourceConfig-r10                      INTEGER (0..31),
            subframeConfig-r10                      INTEGER (0..154),
            p-C-r10                                 INTEGER (-8..15)
        }
    }
                                            OPTIONAL,    -- Need ON
    zeroTxPowerCSI-RS-r10   CHOICE {
        release                                 NULL,
```

TABLE 3-continued

| setup | SEQUENCE { |
| --- | --- |
| zeroTxPowerResourceConfigList-r10 | BIT STRING (SIZE (16)), |
| zeroTxPowerSubframeConfig-r10 | INTEGER (0..154) |
| } | |
| } | |
| OPTIONAL | -- Need ON |
| } | |

In Table 3, 'antennaPortsCount' carries the number (selected among 1, 2, 4, and 8) of antennas through which the CSI-RS is transmitted, 'resourceConfig' carries an RE in which the CSI-RS is positioned in an RB in time-resource frequency, and 'subframeConfig' carries a subframe in which the CSI-RS is transmitted and a CSI-RS EPRE value for PDSCH EPRE. Additionally, the eNB delivers information about a zero power CSI-RS.

In CSI-RS Config, 'resourceConfig' indicates the position at which the CSI-RS is transmitted. This parameter indicates accurate positions of a symbol and a carrier in an RB according to CSI-RS configuration numbers of Table 1 represented as 0 to 31.

Channel State Information (CSI) Feedback

MIMO schemes may be classified into an open-loop MIMO scheme and a closed-loop MIMO scheme. In the open-loop MIMO scheme, a MIMO transmitter performs MIMO transmission without receiving CSI feedback from a MIMO receiver. In the closed-loop MIMO scheme, the MIMO transmitter receives CSI feedback from the MIMO receiver and then performs MIMO transmission. In the closed-loop MIMO scheme, each of the transmitter and the receiver may perform beamforming based on CSI to achieve a multiplexing gain of MIMO transmit antennas. To allow the receiver (e.g., a UE) to feed back CSI, the transmitter (e.g., an eNB) may allocate a UL control channel or a UL-SCH to the receiver.

The CSI feedback may include a rank indicator (RI), a precoding matrix index (PMI), and a channel quality indicator (CQI).

The RI is information about a channel rank. The channel rank indicates the maximum number of layers (or streams) that may carry different information in the same time-frequency resources. Since the rank is determined mainly according to long-term fading of a channel, the RI may be fed back in a longer period than the PMI and the CQI.

The PMI is information about a precoding matrix used for transmission of a transmitter and has a value reflecting the spatial characteristics of a channel. Precoding refers to mapping transmission layers to transmit antennas. A layer-antenna mapping relationship may be determined according to a precoding matrix. The PMI is the index of an eNB precoding matrix preferred by the UE based on a metric such as signal-to-interference-plus-noise ratio (SINR), etc. In order to reduce the feedback overhead of precoding information, the transmitter and the receiver may pre-share a codebook including multiple precoding matrices and only an index indicating a specific precoding matrix in the codebook may be fed back.

In a system supporting an extended antenna configuration (e.g. an LTE-A system), additional acquisition of multi-user (MU)-MIMO diversity using an MU-MIMO scheme is considered. In the MU-MIMO scheme, when an eNB performs downlink transmission using CSI fed back by one UE among multiple users, it is necessary to prevent interference with other UEs from occurring because there is an interference channel between UEs multiplexed in the antenna domain. Accordingly, CSI of higher accuracy than CSI in a single-user (SU)-MIMO scheme should be fed back in order to correctly perform MU-MIMO operation.

A new CSI feedback scheme may be adopted by modifying conventional CSI including an RI, a PMI, and a CQI so as to more accurately measure and report CSI. For example, precoding information fed back by the receiver may be indicated by a combination of two PMIs. One of the two PMIs (a first PMI) has a long-term and/or wideband property, and may be referred to as W1. The other PMI (a second PMI) has a short-term and/or subband property, and may be referred to as W2. A final PMI may be determined by a combination (or a function) of W1 and W2. For example, if the final PMI is denoted by W, W=W1*W2 or W=W2*W1.

The CQI is information indicating channel quality or channel strength. The CQI may be expressed as an index corresponding to a predetermined modulation and coding scheme (MCS) combination. That is, a CQI index that is fed back indicates a corresponding modulation scheme and code rate. In general, the CQI has a value reflecting a reception SINR that can be achieved when an eNB configures a spatial channel using a PMI.

In LTE/LTE-A, a CSI reference resource related to channel measurement for CSI feedback/report described above is defined. In the frequency domain, the CSI reference resource is defined as a group of physical RBs corresponding to a frequency band associated with a calculated CQI. In the time domain, the CSI reference resource is defined as n-nCQI_ref. herein, n indicates a subframe in which the CSI is transmitted/reported, and nCQI_ref indicates: i) the least value corresponding to a valid subframe among the values greater than or equal to 4 in the case of periodic CSI report, ii) a valid subframe corresponding to a subframe in which a CSI request in an uplink DCI format is transmitted in the case of aperiodic CSI reporting; or iii) 4 in the case of a CSI request in the random access response grant in aperiodic CSI reporting. The valid subframe means that it satisfies the following conditions: the subframe should be a DL subframe for the UE; the subframe should not be an MBSFN subframe in modes other than transmission mode 9 environment with a frequency; the DwPTS should be longer than a certain size in TDD; the subframe should not be included in a measurement gap set for the UE; and if a CSI subframe set is configured for the UE in periodic CSI reporting, the subframe should be an element of the CSI subframe set. As described below, the CSI subframe set is for restricted measurement. The CSI subframe set ($C_{CSI,0}$, $C_{CSI,1}$) may be configured for the UE by a higher layer. A CSI reference resource may be included in one of two subframe sets ($C_{CSI,0}$ and $C_{CSI,1}$. For simplicity, $C_{CSI,0}$ is denoted by C0, $C_{CSI,1}$ is denoted by C1), but not in both sets.

Heterogeneous Deployments

Figure 7:
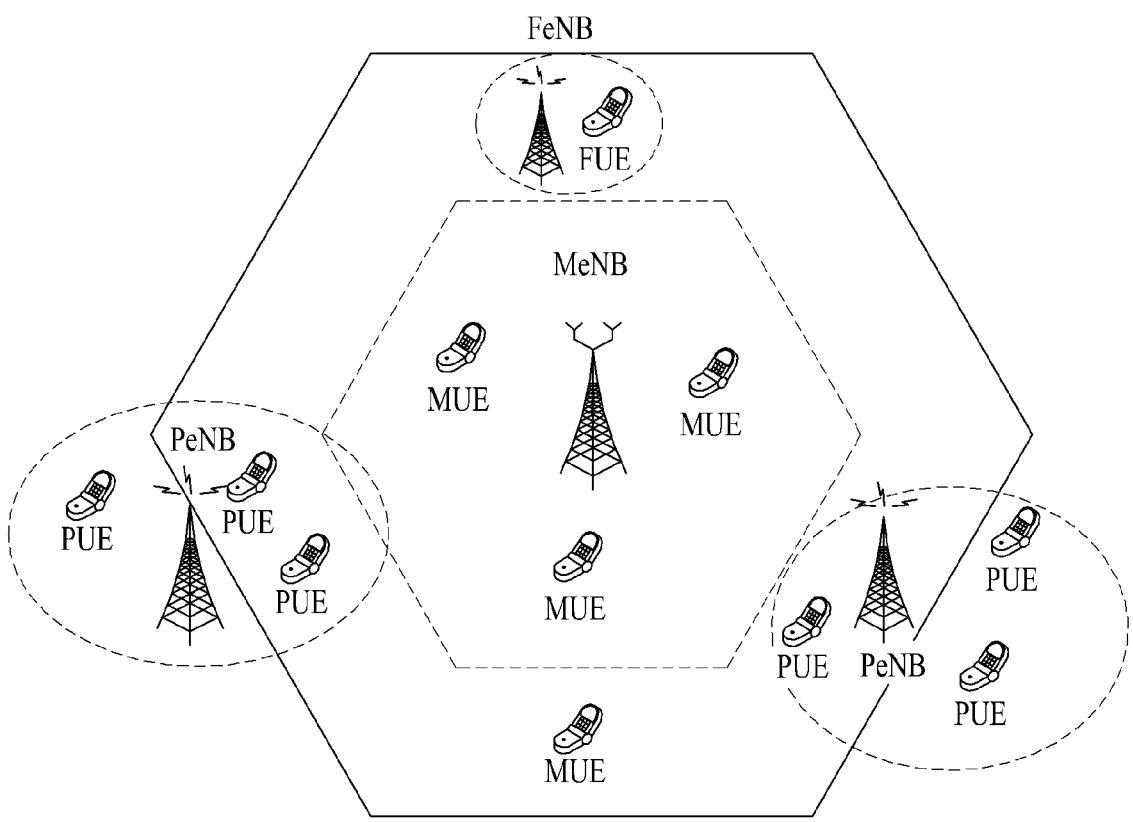
FIG. 7 is a diagram illustrating a heterogeneous network environment.

FIG. 7 illustrates a heterogeneous network wireless communication system including a macro eNB (MeNB) and micro eNBs (PeNBs or FeNBs). The term "heterogeneous network" refers to a network in which an MeNB and a PeNB or FeNB coexist even when they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. The CoMP technology may increase the performance of UEs located at a cell edge and the average sector throughput.

In a multi-cell environment with a frequency reuse factor of 1, the performance of a UE located at a cell edge and average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a given time point, while the other transmission points in the CoMP cooperation unit do not transmit data to the UE at the time point. A transmission point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination of cells of the CoMP cooperation units.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination of the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

FIG. 8 illustrates a CoMP cluster. A CoMP cluster refers to a CoMP cooperation unit mentioned above. FIG. 8(a) illustrates a case in which cells in a CoMP cluster use different physical cell IDs (PCIDs), and FIG. 8(b) illustrates a case in which cells in a CoMP cluster use the same PCID. Even in the case that the cells use the same PCID in a CoMP cluster, the CoMP clusters (CoMP clusters A, B in FIG. 8(b)) may use different PCIDs, and the cells in a single cluster may be configured in the form of a distributed antenna of an eNB or an RRH by sharing a PCID. In a variation, some of the cells in a cluster may share a PCID.

If the cells share the PCID, all the cells having the same PCID may transmit a common signal such as a primary synchronization signal (PSS)/secondary synchronization signal (SSS), a CRS, a PBCH, or a CRS-based PDCCH/PDSCH at the same time. Thereby improving quality of received signals and removing the communication shadow area. Alternatively, some cells having higher transmission power than may transmit a common signal among the cells having the same PCID, and the other cells may not transmit a common signal. However, in the case of unicast data transmission through a CSI-RS, a UE-specific RS and a UE-specific RS-based PDSCH, each cell may individually perform transmission, and have a cell splitting gain.

CSI-RS Measurement and Channel State Information (CSI) Reporting in an CoMP Environment Hereinafter, a description will be given of CSI-RS measurement and CSI reporting in a CoMP environment, based on the descriptions given above.

In a CoMP environment, a UE may measure CSI-RSs of the serving cell thereof and a neighbor cell and feed the channel information thereabout back to an eNB to allow the eNB/network to determine an appropriate CoMP transmission technique. To this end, the eNB, i.e., the serving cell, needs to inform of CSI-RS configurations thereof and CSI-RS configurations of neighbor cells. In informing of CSI-RS configurations of the neighbor cells, the eNB may inform of the CSI-RS configurations as if it has multiple CSI-RS configurations, and inform of a configuration for which the eNB can perform feedback operation (a transparent scheme). That is, the UE does not need to know a neighbor cell in which CSI-RS transmission according to each CSI-RS is performed, and may measure CSI-RSs according to the defined CSI-RS configurations and correspondingly perform feedback of CSI. Alternatively, when the eNB informs of CSI-RS configurations of a neighbor cell, it may allow the UE to identify the neighbor cell related to the CSI-RS configurations (a non-transparent scheme).

Next, to allow for CSI-RS measurement and CSI reporting of the UE, the eNB and the UE pre-agree on channel information combinations which may be produced by combining multiple CSI-RS configurations, and a channel information combination to be subjected to CSI feedback may be designated through signaling.

Figure 9:
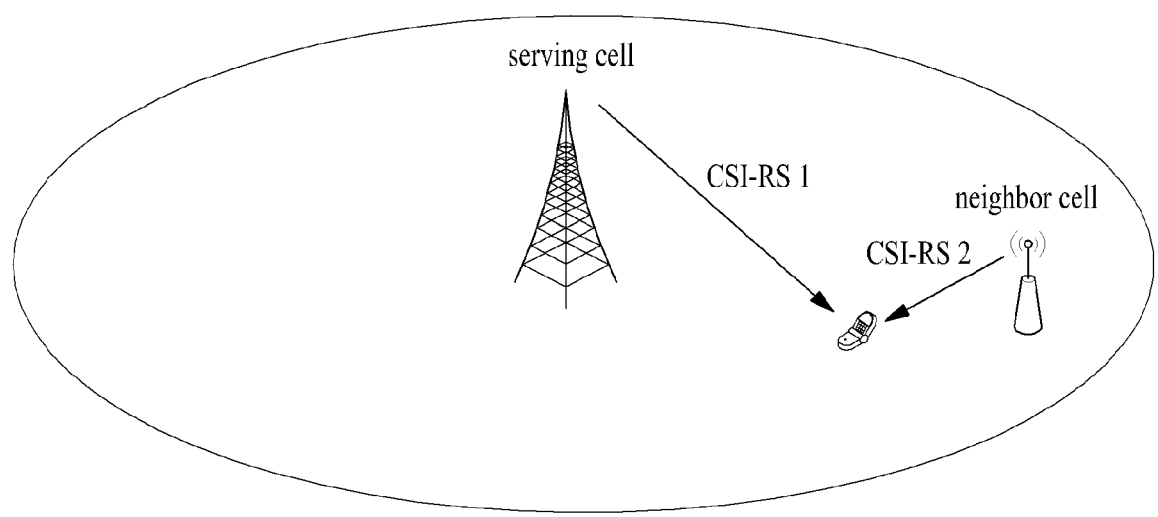
FIGS. 9 to 11 illustrate embodiments of the present invention.

For example, when it is assumed that two cells constitute a CoMP cluster as shown in FIG. 9, the following three CSI-RS configurations may be established, wherein it is assumed that the serving cell has A transmit antennas, and a neighbor cell has B transmit antennas:

i) Configuration 1: A CSI-RS configuration of the serving cell (a CSI-RS for A antennas);

ii) Configuration 2: A CSI-RS configuration for the neighbor cell (a CSI-RS for B antennas); and iii) Configuration 3: A CSI-RS configuration for joint transmission (a CSI-RS for A+B antennas).

Combinations of CSI-RS configurations on which the eNB and the UE can agree and details of CSI feedback according to the combinations are shown in Table 4.

TABLE 4

| | CSI-RS configuration 1 | CSI-RS configuration 2 | CSI-RS configuration 3 | Content to be CSI-fed back |
|---|---|---|---|---|
| Case 1 | On | Off | Off | CSI feedback for the serving cell |
| Case 2 | Off | On | Off | CSI feedback for the neighbor cell |
| Case 3 | On | On | Off | joint or split CSI feedback for the serving cell and the neighbor cell |
| Case 4 | Off | Off | On | CSI feedback for Fake single cell |
| Case 5 | On | Off | On | CSI feedback for the serving cell and CSI feedback for fake single cell |

Referring to Table 4, in Case 1, the UE performs CSI reporting for the serving cell. That is, according to Table 4, since only CSI-RS configuration 1 is in an on state, the UE receives/measures CSI-RS 1 transmitted according to CSI-RS configuration 1 and then performs CSI reporting based on CSI-RS 1. Herein, CSI-RS 1 is transmitted from the serving cell, and therefore CSI reporting by the UE is CSI feedback for the serving cell. This CSI is identical to the CSI fed back from the UE in a normal non-CoMP environment.

In Case 2, the UE measures the CSI-RS of a neighbor cell according to CSI-RS configuration 2, and then feeds the neighbor cell CSI to the eNB. At this time, the UE generates CSI, regarding the measured channel as a serving cell channel. That is, in Case2, the measured channel is different from that of Case 1, but the CSI is generated in the same manner as in Case 1.

In Case 3, CSI-RS configurations 1 and 2 are in the On state, and thus the UE measures both the CSI-RS of the serving cell and the CSI-RS of the neighbor cell. Thereafter, the UE produces serving cell CSI and neighbor cell CSI and sends the same to the eNB together/individually on uplink. Alternatively, the UE may send CSI for CoMP to the eNB, assuming a specific CoMP operation. For example, the UE may calculate rank and CQI, and select and feed back PMI which is selected in a codebook for joint transmission, assuming CoMP joint transmission.

In Case 4, the UE generates and feeds back appropriate CSI information, assuming that the measured channel is a channel for the serving cell having A+B transmit antennas. For example, if A=B=4, the UE generates PMI, rank, and CQI which are defined in 8Tx single cell environment, and feeds the same back to the serving eNB. In this case, each eNB should transmit CSI-RSs according to the position of REs of single cell CSI-RS for A+B antennas to allow the UE to measure/report CSI assuming an 8 Tx single cell environment without constraints. For example, if single cell CSI-RSs for A+B antennas are allocated to RE 1 to RE A+B, the serving cell and the neighbor cell respectively use REs #1 to #A and RE #A+1 to RE #A+B to transmit the CSI-RSs, which will be described with reference to FIG. 10.

Figure 10:
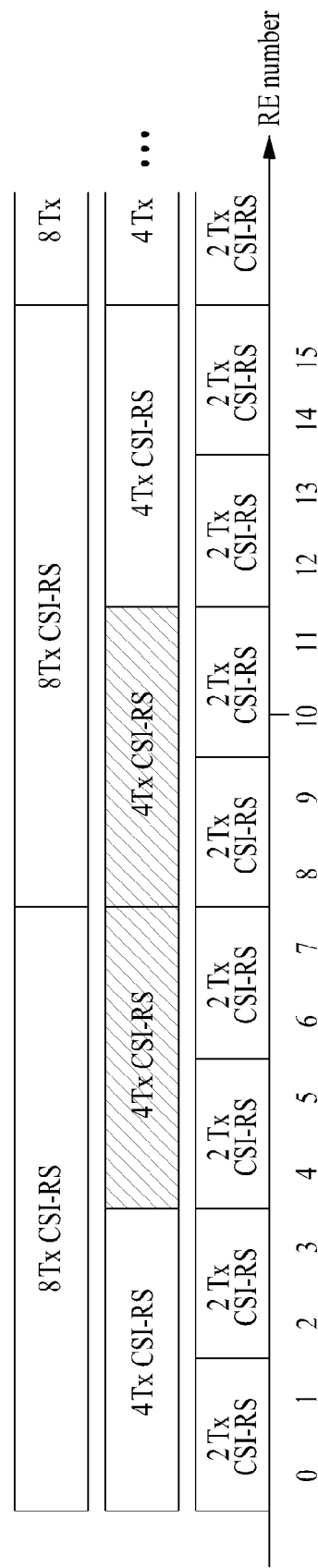

As shown in FIG. 10, CSI-RS-to-RE mapping according to the number of antennas generally has a tree structure. That is, REs for 8 Tx CSI-RSs correspond to a union of REs for two neighboring 4 Tx CSI-RSs, and REs for a 4 Tx CSI-RS is a union of REs for two neighboring 2 Tx CSI-RSs. If the neighboring CSI-RSs does not form a tree structure as in the case of the 4 Tx CSI-RS (RE #4 to RE #7) and the 4 Tx CSI-RS (RE #8 to RE #11), the REs cannot be used for an 8Tx CSI-RS. That is, if the serving cell uses REs #4 to #7, and a neighbor cell uses REs #8 to #11, the eNB does not need to transmit an additional CSI-RS. For example, the serving cell needs to transmit a new 4 Tx CSI-RS (RE #12 to RE #15), or the neighbor cell needs to transmit a new 4Tx CSI-RS (REs #0 to #3), or both cells need to transmit a new 4Tx CSI-RS (satisfying a tree structure), such that the UE configures the received CSI-RSs as an 8 Tx CSI-RS.

When additional CSI-RSs are transmitted as above, control signal overhead may be caused, but performance may be enhanced as the added CSI-RSs transmitted according to the properties of the UE. In other words, since the added CSI-RSs are used only for a CoMP UE, optimized design and transmission restricted to this use may be implemented. For example, considering that a CoMP UE is generally positioned at a cell boundary, precoding may be used such the added CSI-RS is beamformed toward the cell boundary. Alternatively, the UE may apply precoding to CSI-RSs such that the spatial property of a channel measured based on the CSI-RS from the neighbor cell and the serving cell becomes similar to the spatial property of the single cell PMI codebook for A+B transmit antennas. In the case in which a CSI-RS is transmitted with precoding applied thereto, when the eNB actually transmits data to the corresponding CoMP UE, it needs to apply a precoder applied to the CSI-RS in addition to the precoder calculated from the CSI. That is, if transmission data, a precoding matrix obtained from CSI, and a precoding matrix applied to the CSI-RS are x, W, and W0 respectively, a transmission signal becomes W0×W×x, and the signal received by the UE is y=H×W0×W×x+N. Herein, N represents noise.

In Case 5, the UE measures a serving cell CSI-RS and at the same time measures CSI-RSs from the serving cell and a neighbor cell. Thereafter, the UE generates and feeds back non-CoMP CSI over a channel measured based on the serving cell CSI-RS. The UE may generate and feed back appropriate CSI, assuming that a channel measured based on the A+B antenna CSI-RS is a channel to a serving cell having A+B transmit antennas.

When the serving cell allowing the UE to perform CSI reporting in Case 1 needs CoMP information, it may switch the CoMP UE to Cases 2 to 5 to acquire CSI necessary for CoMP.

CSI-RS Measurement and Channel State Information Reporting for Joint Transmission Hereinafter, CSI-RS measurement and CSI reporting for joint transmission in a CoMP environment discussed above will be described. To implement CSI-RS measurement and CSI reporting for joint transmission, the eNB and the UE may pre-agree on a channel information combination which may be produced by combining multiple CSI-RS configurations. Herein, the channel information combination may be delivered through RRC signaling. In addition, as described below, the channel information combination may include at least one CSI-RS configuration to be used for channel estimation and a plurality of feedback type indexes including information about a valid channel related to the CSI-RS configuration.

If a channel information combination is agreed on between the eNB and the UE as above, the eNB may dynamically or semi-statically inform the UE of the channel information combination that needs to be fed back. Herein, in the case of dynamic informing, the channel information combination may be carried in a DCI format which is transmitted over a PDCCH/Enhanced PDCCH. Semi-static informing may correspond to RRC signaling.

The UE may measure/estimate a (valid) channel based on the designated/indicated channel information combination, and calculate and feed back channel state information (e.g., one of RI, PMI, and CQI) based on the measurement/estimation.

Figure 11:
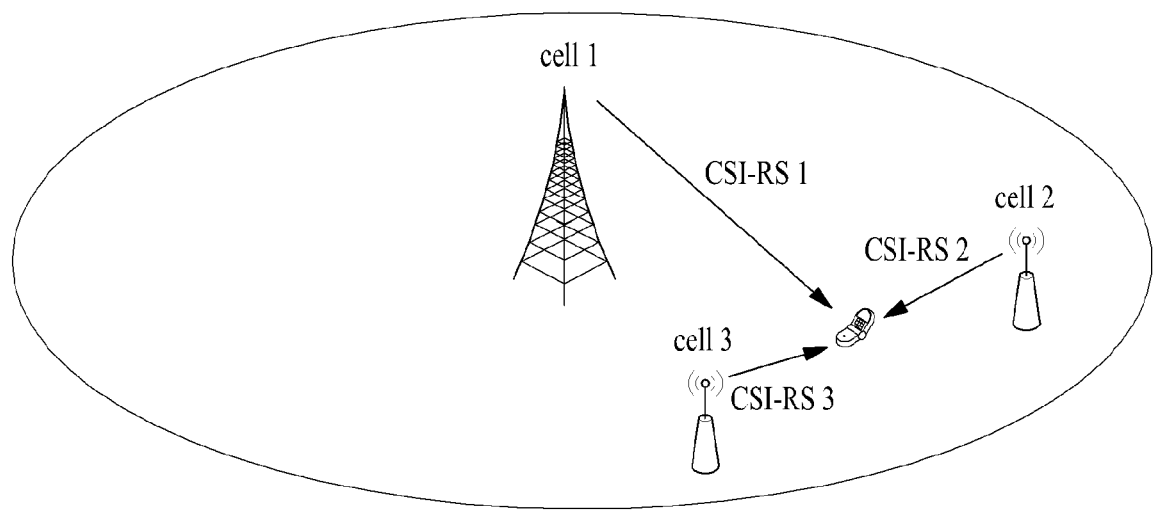

Hereinafter, a description will be given of CSI-RS measurement and channel state information reporting for joint transmission in the case in which three cells are capable of performing coordinated transmission to the UE as shown in FIG. 11, as a specific example of the above discussion.

FIG. 11 shows a CoMP cluster including cell 1, which is a serving cell, and cells 2 and 3 which are capable of performing coordinated transmission with cell 1. Cell 1 transmits CSI-RS 1 according to CSI-RS configuration 1, cell 2 transmits CSI-RS 2 according to CSI-RS configuration 2, and cell 3 transmits CSI-RS 3 according to CSI-RS configuration 3. In this case, channel information combination/CSI feedback schemes that may be agreed on between an eNB and UEs are listed in Table 4 below.

TABLE 4

| Feedback type index [encoding] | Relevant CSI-RS configuration | Valid channel for RI/PMI/CQI calculation | Purpose |
|---|---|---|---|
| 1 [001] | CSI-RS configuration 1 | $H_1$ | Single cell transmission by cell 1 |
| 2 [010] | CSI-RS configuration 2 | $H_2$ | Single cell transmission by cell 2 |
| 3 [011] | CSI-RS configuration 3 | $H_3$ | Single cell transmission by cell 3 |
| 4 [100] | CSI-RS configuration 1 & 2 | $[H_1^T H_2^T]^T$ | Joint transmission by cell 1 and cell 2 |
| 5 [101] | CSI-RS configuration 1 & 3 | $[H_1^T H_3^T]^T$ | Joint transmission by cell 1 and cell 3 |
| 6 [110] | CSI-RS configuration 2 & 3 | $[H_2^T H_3^T]^T$ | Joint transmission by cell 2 and cell 3 |
| 7 [111] | CSI-RS configuration 1 & 2 & 3 | $[H_1^T H_2^T H_3^T]^T$ | Joint transmission by cell 1, cell 2 and cell 3 |

In Table 4, $H_1$, $H_2$, and $H_3$ represent channel information/channel matrices obtained by the UE through channel estimation of CSI-RS configuration 1, CSI-RS configuration 2, and CSI-RS configurations 3, respectively. In addition, T represents transpose. The valid channels for four or more cells may be generalized as $[H_{H1}^T H_{H2}^T \ldots H_{nm}^T]^T$ (wherein, m denotes the number of CSI-RS configurations indicated by a feedback type index, and n1 to nm denote CSI-RS configuration indexes).

In Table 4, feedback type indexes 1, 2, and 3 represent appropriate CSI feedbacks in the case in which each of cells 1, 2 and 3 transmits a signal to a UE alone. The UE may estimate a channel through a corresponding CSI-RS configuration, and then calculate and feed back RI/PMI/CQI based on the estimated channel. In addition, feedback type indexes 4, 5, and 6 represent appropriate CSI feedbacks in the case in which two cells (any two cells among cell 1 to cell 3 in FIG. 11) perform joint transmission. The UE estimates channels from two cells to perform joint transmission through the corresponding CSI-RS configurations, and then creates a valid channel which assumes that joint transmission is performed with the two channels being consecutive. The UE may calculate RI/PMI/CQI based on this valid channel and implement CSI feedback. For example, in FIG. 11, in the case in which a serving cell makes a request for CSI reporting to the UE in order to perform joint transmission with cell 2, cell 1 may instruct the UE to report CSI according to feedback type index 4. The UE receives CSI-RS 1 and CSI-RS 2 according to CSI-RS configuration 1 and 2 respectively and performs channel estimation. At this time, channel estimation may be performed by calculating one or more of RI, PMI and CQI based on valid channels $[H_1^T H_2^T]^T$ as shown in Table 4.

Next, feedback type index 7 represents appropriate feedback in the case in which three cells perform joint transmission. The UE may perform calculation of RI/PMI/CQI based on consecutive valid channels $[H_1^T H_2^T H_3^T]^T$.

As described above, the eNB may dynamically/semi-statically indicate, for the UE, a feedback type index in Table 4 to be used in reporting CSI.

The eNB may semi-statically indicate, for the UE, a feedback type index to be used in CSI through RRC signaling. For example, the eNB may instruct the UE, through RRC signaling, to periodically feed back feedback type indexes 1, 2, 3, and 7.

Alternatively, the eNB may trigger a desired feedback type index over a PDCCH/EPDCCH according to a feedback type index configuration methods as Table 4 delivered through RRC signaling. In a method to implement such dynamic triggering, a feedback type index requesting CSI feedback may be indicated with 3 bits. That is, in Table 4, 3 bits corresponding to [encoding] of a feedback type index may be contained in DCI. For example, in the case in which DCI contains 100 as bits for a corresponding feedback type index, feedback type index 4 may be requested. In another method to implement dynamic triggering, a bitmap for all feedback type indexes requesting CSI feedback may be used. For example, bitmap 1110001 may indicate that the UE is instructed to feed back feedback type indexes 1, 2, 3, and 7. Herein, bits which may be indicated over a PDCCH are limited, the number of possible combinations among all possible feedback type indexes (through, for example, RRC signaling) may be limited. For example, if available feedback type indexes are restricted to indexes 1, 2, 3 and 7, only two bits may be needed to indicate a feedback type index.

A combination of the periodic triggering scheme and the dynamic triggering scheme may be employed. For example, feedback information such as feedback type indexes 1, 2 and 3 proper for non-CoMP, DPS and CS/CB and feedback type indexes for a single cell may be set to be periodically fed back, and feedback information such as feedback type indexes 4, 5, 6 and 7 (i.e., feedback type indexes for two or more cells) proper for joint transmission may be dynamically triggered.

TABLE 5

| Feedback type index [encoding] | Relevant CSI-RS configuration | Valid channel for RI/PMI/CQI calculation | Purpose |
|---|---|---|---|
| 1 [001] | CSI-RS configuration 1 | $H_1$ | Single cell transmission by cell 1 |
| 2 [010] | CSI-RS configuration 2 | $H_2$ | Single cell transmission by cell 2 |
| 3 [011] | CSI-RS configuration 1 & 2 | $[H_1^T H_2^T]^T$ | Joint transmission by cell 1 and cell 2 |
| 4 [100] | CSI-RS configuration 3 | $H_3$ | Single cell transmission by cell 3 |
| 5 [101] | CSI-RS configuration 1 & 3 | $[H_1^T H_3^T]^T$ | Joint transmission by cell 1 and cell 3 |
| 6 [110] | CSI-RS configuration 2 & 3 | $[H_2^T H_3^T]^T$ | Joint transmission by cell 2 and cell 4 |
| 7 [111] | CSI-RS configuration 1 & 2 & 3 | $[H_1^T H_2^T H_3^T]^T$ | Joint transmission by cell 1, cell 2 and cell 3 |

In Table 5, regarding the binary values representing the feedback type indexes, the positions of '1' are set to indicate CSI (aggregated for feedback)-RS configuration indexes. For example, if relevant CSI-RS configurations are CSI-RS configuration 1 and CSI-RS configuration 2, the feedback type index may be determined to be 011 such that the position of feedback type index 1 indicates the CSI-RS configuration index. In this case, the UE may recognize the relevant CSI-RS configuration from the feedback type index alone.

As shown in Table 3 and Table 4, in the case in which a combination of channel information items is agreed on between the eNB and the UE, the eNB may indicate, for the UE, feedback type index(es) and/or a feedback type index to be reported through a CSI request field. In other words, the eNB and the UE may agree on a CSI report set through RRC signaling and dynamically trigger feedback type indexes. That is, configurations shown in Table 6 below may be used.

TABLE 6

| Value of CSI request field | Description | Configuration example 1 | Configuration example 2 | Configuration example 3 | Configuration example 4 |
|---|---|---|---|---|---|
| '00' | No aperiodic CSI report is triggered | | | | |
| '01' | Aperiodic CSI report is triggered for a 1st set of feedback CSI indexes configured by higher layers | Feedback type index 1 | Feedback type index 1 | Feedback type index 1 | Feedback type index 1 |
| '10' | Aperiodic CSI report is triggered for a 2nd set of feedback CSI indexes configured by higher layers | Feedback type index 2 | Feedback type index 1, 2 | feedback type index 1, 3, 5 | The best feedback type index of feedback type indexes 1 to 3 |
| '11' | Aperiodic CSI report is triggered for a 3rd set of feedback CSI indexes configured by higher layers | Feedback type index 3 | Feedback type index 1, 2, 3 | Feedback type index 1, 3, 5, 7 | The best feedback type index of feedback type indexes 4 to 7 |

Embodiments are not limited to configurations shown in Table 4. Configurations shown in Table 5 below are also possible.

Referring to Table 6, when the CSI request field is set to '00', this indicates that no CSI feedback is requested. The field values '01', '02' and '03' respectively indicate request of CSI feedback for each of CSI report sets 1, 2 and 3 pre-agreed on through RRC signaling. Each CSI report set includes information related to one or more feedback type indexes and/or a feedback type index to be reported.

More specifically, in the case of configuration example 4, the CSI request field value '00' may indicate that no CSI report is triggered, and the field value '01' may indicate feedback type index 1, namely, command channel estimation and CSI reporting for the serving cell. Therefore, the UE performs channel estimation and CSI reporting according to Table 4 (or according to Table 5, if a combination of channel information items between the UE and the eNB is from Table 5). If the CSI request field has a value of '10', the UE performs channel estimation and CSI calculation for each of feedback type indexes 1 to 3 according to Table 4. Then, the UE reports a result for the best feedback type index. This case may be used for a CoMP transmission technique such as dynamic selection of a single cell reporting optimum CSI. If the value of the CSI request field is '11', the UE may perform channel estimation and CSI calculation for each of feedback type indexes for two or more cells, i.e., feedback type indexes 4 to 7 according to Table 4, and then report a result for the best feedback type index. This case may be used for selection of a joint transmission technique of reporting optimum CSI for valid channels established by two or more cells.

Figure 12:
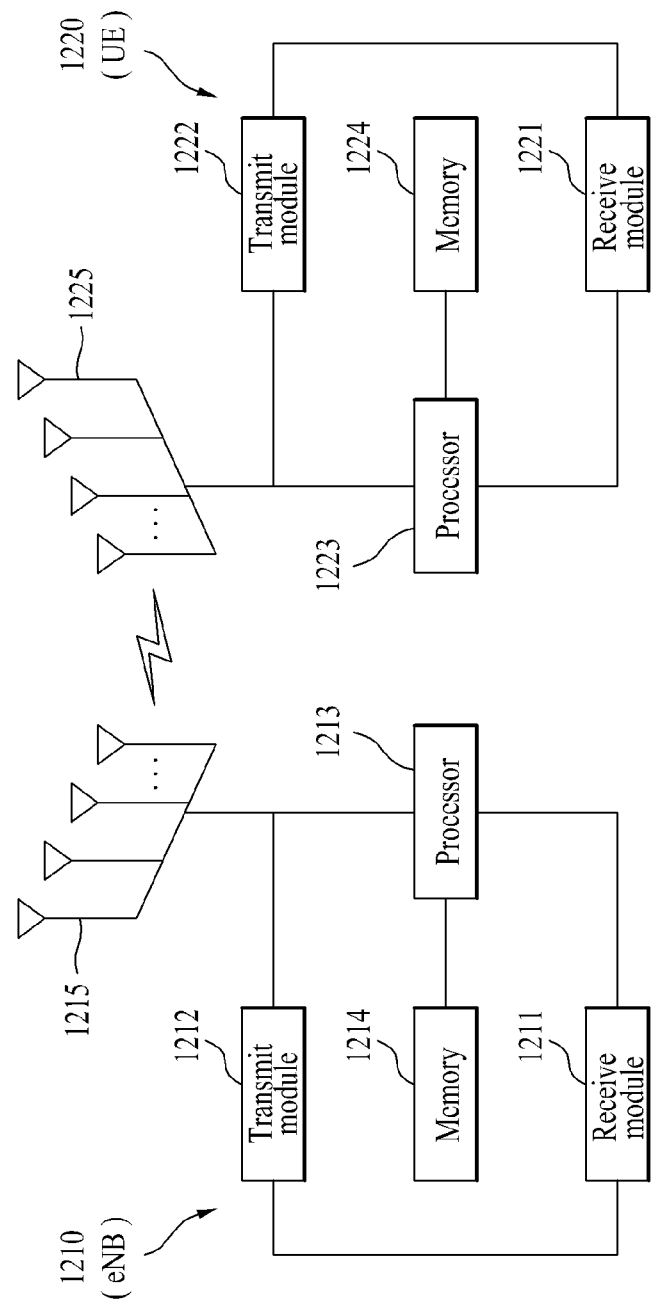
FIG. 12 is a diagram illustrating configurations of transceivers.

FIG. 12 is a diagram illustrating configurations of an eNB and a UE according to one embodiment of the present invention.

Referring to FIG. 12, an eNB 1210 may include a receive module 1211, a transmit module 1212, a processor 1212, a memory 1214, and a plurality of antennas 1215. The antennas 1215 represent an eNB that supports MIMO transmission and reception. The receive module 1211 may receive various signals, data and information from a UE on uplink. The transmit module 1212 may transmit various signals, data and information to a UE on downlink. The processor 1212 may control overall operation of the eNB 1210.

The processor 1212 of the eNB 1210 according to one embodiment of the present invention may operate to implement the embodiments described above.

Additionally, the processor 1212 of the eNB 1210 may function to operationally process information received by the eNB 1210 or information to be transmitted from the eNB 1210, and the memory 1214, which may be replaced with an element such as a buffer (not shown), may store the processed information for a predetermined time.

Referring to FIG. 12, a UE 1220 may include a receive module 1221, a transmit module 1222, a processor 1223, a memory 1224, and a plurality of antennas 1225. The antennas 1225 represent a UE that supports MIMO transmission and reception. The receive module 1221 may receive various signals, data and information from the eNB on downlink. The transmit module 1222 may transmit various signals, data and information to the eNB on uplink. The processor 1223 may control overall operation of the UE 1220.

The processor 1223 of the UE 1220 according to one embodiment of the present invention may perform operations necessary for implementation of the embodiments described above.

Additionally, the processor 1223 of the UE 1220 may function to operationally process information received by the UE 1220 or information to be transmitted from the UE 1220, and the memory 1224, which may be replaced with an element such as a buffer (not shown), may store the processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 1210 in FIG. 12 may be equally applied to a relay as a downlink transmitter or an uplink receiver, and description of the UE 1220 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for reporting channel state information by a user equipment (UE) in a wireless communication system, the method comprising:

receiving information comprising a channel state information (CSI) request field; and performing an aperiodic CSI report triggered by the CSI request field, wherein the CSI request field indicates one of 'no aperiodic CSI report is triggered', 'the aperiodic CSI report is triggered for a first set of CSI feedback type configured via radio resource control (RRC) signaling', 'the aperiodic CSI report is triggered for a second set of CSI feedback type configured via RRC signaling', and 'the aperiodic CSI report is triggered for a third set of CSI feedback type configured via RRC signaling', and wherein at least one CSI feedback type in the first, second or third set of the CSI feedback type is associated with at least two channel state information-reference signal (CSI-RS) configurations.

2. The method according to claim 1, wherein each of the CSI feedback types is one of a CSI feedback type related to a transmission from a single transmission point and a CSI feedback type related to joint transmission from two or more transmission points.

3. The method according to claim 1, wherein aperiodic CSI reporting is performed through transmission on a physical uplink shared channel.

4. The method according to claim 1, wherein the information comprising the CSI request field is transmitted through higher layer signaling.

5. The method according to claim 1, wherein the information comprising the CSI request field is transmitted in control information on a physical downlink control channel.

6. The method according to claim 1, wherein each of the CSI feedback types indicates a valid channel related to the at least one of the at least two CSI-RS configurations, and the valid channel is expressed by the following equation:

$$[H_{n1}^T H_{n2}^T \ldots H_{nm}^T]^T,$$

wherein H denotes a channel matrix, m denotes the number of CSI-RS configurations indicated by a feedback type index, n1 to nm denote CSI-RS configuration indexes, and T denotes transpose.

7. The method according to claim 1, wherein the at least two CSI-RS configurations include a CSI-RS configuration for a first group of antenna ports and a CSI-RS configuration for a second group of antenna ports.

8. A user equipment in a wireless communication system, the user equipment comprising a receive module; and a processor configured to:

receive information comprising a channel state information (CSI) request field, and perform an aperiodic CSI report triggered by the CSI request field, wherein the CSI request field indicates one of 'no aperiodic CSI report is triggered', 'the aperiodic CSI report is triggered for a first set of CSI feedback type configured via radio resource control (RRC) signaling', 'the aperiodic CSI report is triggered for a second set of CSI feedback type configured via RRC signaling', and 'the aperiodic CSI report is triggered for a third set of CSI feedback type configured via RRC signaling', and wherein at least one CSI feedback type in the first, second or third set of the CSI feedback type is associated with at least two channel state information-reference signal (CSI-RS) configurations.

9. The user equipment according to claim 8, wherein the at least two CSI-RS configurations include a CSI-RS configuration for a first group of antenna ports and a CSI-RS configuration for a second group of antenna ports.

* * * * *